Jan. 3, 1967     M. F. KLOSTERMAN     3,295,880

SPRING BIASED BUMPER

Filed Oct. 19, 1965

INVENTOR.
Myles F. Klosterman
BY
Sam J. Slotsky
ATTORNEY

3,295,880
SPRING BIASED BUMPER
Myles F. Klosterman, Elkton, S. Dak. 57026
Filed Oct. 19, 1965, Ser. No. 497,658
1 Claim. (Cl. 293—85)

My invention relates to a bumper arrangement.

An object of my invention is to provide a bumper arrangement especially useful for heavy trucks or wreckers, and which bumper arrangement is spring loaded so as to prevent injury to a vehicle which is being pushed for instance.

A further object of my invention is to provide a spring loaded bumper arrangement whereby most of the strains normally encountered in rigid bumpers are absorbed.

A further object of my invention is to provide an arrangement wherein a lighter vehicle will be able to push a much heavier vehicle from a stationary position.

Figure 1:
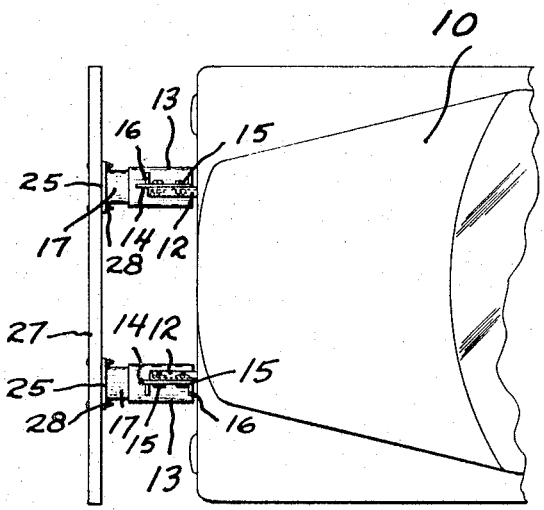
Figure 2:
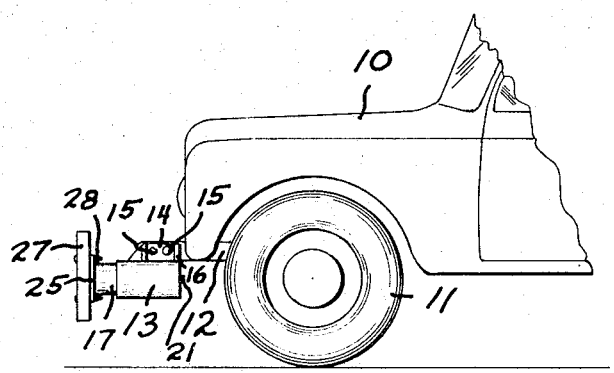
Figure 3:
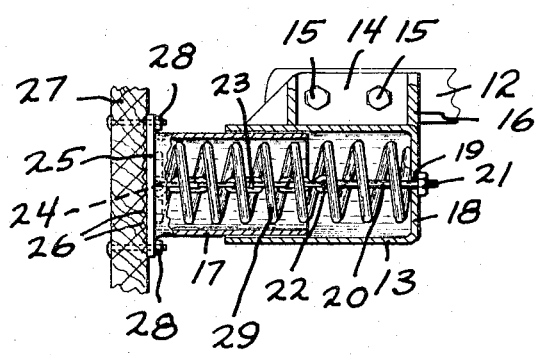

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

FIGURE 1 is a plan view of the bumper as attached to the forward end of a truck, FIGURE 2 is a side elevation of FIGURE 1, and FIGURE 3 is an enlarged sectional detail of one of the spring loaded units.

My invention contemplates the provision of a bumper arrangement for wreckers or other trucks and wherein the bumper will efficiently operate to push vehicles without excessive strain, etc.

In describing my invention, I have used the character 10 to indicate generally the forward end of a truck, the character 11 indicating the forward wheels, and the character 12 indicating the laterally spaced framework portions.

The device of my invention comprises a pair of outer cylinders 13 to which are attached the integral flanges 14, the flanges 14 being bolted as at 15 to the framework members 12.

The character 16 indicates strengthening gussets, and the character 17 indicates a pair of inner cylindrical members received in the cylinders 13, the character 18 indicating end walls of the cylinders 13. Passing through the end walls 18 at 19 are the studs or rods 20 threadably engaged with the nuts 21, and attached to the ends of the rods 20 at 22 are the chains 23 which are secured at 24 to the end plates 25, which end plates are formed integrally with the inner cylinders 17.

The character 26 indicates serrations formed in the plates 25 to provide roughened surfaces, and the character 27 indicates a wooden or other material plank, the plank 27 being bolted to the plates 25 by means of the through-bolts 28.

The plank 27 is of any desired length to provide an abutment surface when pushing a vehicle.

Received in the cylinders 17 and also within the cylinders 13 are the strong helical compression springs 29, which also receive the rods 20 and chains 23.

The rod and chain assemblies hold the cylinder units together, and the chains 23 have the additional advantage of providing a flexible supporting or holding arrangement without requiring the use of extra long rods which would become worn, etc., wherever they would be adjacent to other cylinder surfaces, and yet permit a completely flexible arrangement.

It will be noted that in use, a smaller, lighter vehicle can approach a much heavier vehicle at a relatively higher rate of speed to start the motion of the heavier vehicle without damage to the bumpers and other parts, due to the above described resilient arrangement. Also, since either of the flexible units can yield when both vehicles turn a corner, a smooth and uniform effect will be provided without the bumper sliding off or sliding to one side, etc.

The units are easily installed or can be removed for repair, and it will now be noted that I have provided the advantages mentioned in the objects of my invention, with further advantages being apparent.

Some changes may be made in the construction and arrangement of the parts of my invention without departing from the real spirit and purpose of my invention, and it is my intention to cover by my claim any modified forms of structure or use of mechanical equivalents which may be reasonably included within their scope.

I claim as my invention:

A spring loaded bumper comprising a pair of transversely spaced cylinders, means for attaching said cylinders to a vehicle, a pair of further transversely spaced cylinders received in said cylinders, said cylinders having abutment ends, plates attached to said further cylinders, helical springs received in said cylinders adapted to bear against said abutment ends and said plates, a transversely positioned bumper member attached to said plates, chains attached to said plates, rods attached to said chains and attached to said abutment ends, flanges attached to said cylinders, bolts for attaching said flanges to said vehicle.

References Cited by the Examiner
UNITED STATES PATENTS

| | | | |
|---|---|---|---|
| 1,438,177 | 12/1922 | Hatashita | 293—86 |
| 1,503,049 | 7/1924 | Jezek | 293—85 |
| 1,564,488 | 12/1925 | Nastri | 293—86 |
| 1,645,723 | 10/1927 | Schmidt | 293—86 |
| 2,145,952 | 2/1939 | Ryan | 293—71 |
| 2,679,405 | 5/1954 | Snyder | 280—481 |

ARTHUR L. LA POINT, *Primary Examiner.*

H. BELTRAN, *Assistant Examiner.*